United States Patent Office 3,681,297
Patented Aug. 1, 1972

3,681,297
SYNTHESIS OF POLYBENZOTHIAZOLINES AND POLYBENZOTHIAZOLES BY REACTING A DI-ALDEHYDE WITH AN AROMATIC BIS-MER-CAPTOAMINE
Gaetano Francis D'Alelio, 2011 E. Cedar St., South Bend, Ind. 46617
No Drawing. Filed Nov. 10, 1970, Ser. No. 88,476
Int. Cl. C08g 9/06
U.S. Cl. 260—72.5
21 Claims

ABSTRACT OF THE DISCLOSURE

This invention deals with a novel, relatively simple process of preparing polybenzothiazolines,

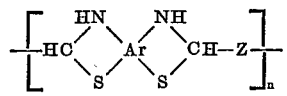

by reacting dialdehydes, $Z(CHO)_2$ and 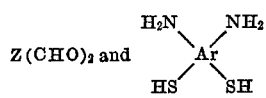

in a solvent in an inert atmosphere and thereafter oxidizing the polybenzothiazolines to polybenzothiazoles,

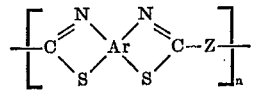

wherein Ar represents a tetravalent aromatic moiety in which the nitrogen and sulfur atoms in each pair are disposed ortho to each other and Z represents a divalent hydrocarbon moiety as the residue of the dialdehyde, $Z(CHO)_2$. New types, as well as the known types of polybenzothiazoles have been prepared by this process.

PRIOR ART

The synthesis of a number of polybenzothiazoles have been reported in the Journal of Polymer Science, A3, 1665 (1965) by the reaction, at high temperature, of aromatic dicarboxylic acids and such derivatives as the diphenyl esters with dimercaptobenzidine.

SUMMARY OF THE INVENTION

This invention is concerned generally with the class of polymers known as the polybenzothiazoles which have the repeating unit,

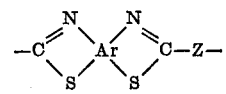

wherein
Ar represents an organic tetravalent aromatic moiety in which the =N— and —S— groups are disposed ortho to each other, and
Z represents a divalent organic moiety as the residue of the dialdehyde, $Z(COH)_2$.
Specifically, this invention deals with a novel, relatively simple process for preparing the polybenzothiazole; this new process, also is particularly suited for the preparation of the new types of polybenzothiazoles which cannot be prepared by the currently known processes.
Currently, the polybenzothiazoles are prepared by reacting a bis-ortho-mercaptoaniline with a diphenyl isophthalate or terephthalate ester at high temperatures for relatively long periods of time [see J. Polymer Science, A3, 1665 (1965)] according to Equation 1.

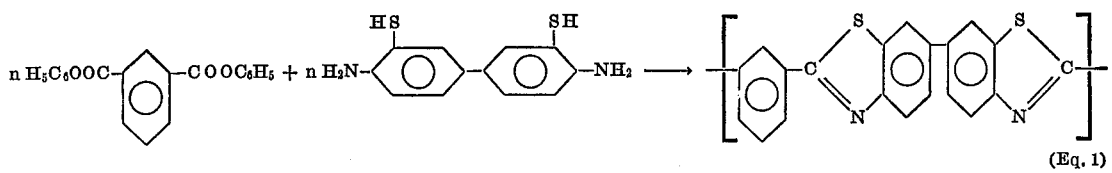

(Eq. 1)

When the reaction of Equation 1 is performed as a melt polymerization, in fusible, intractable polymers of little or no utility are obtained. When the polymers of Equation 1 are prepared by heating the reagents in polyphosphoric acid at 190° C. for eight hours, they are insoluble in practically all organic solvents but they are soluble in concentrated sulfuric acid, chlorosulfonic acid etc., which severely restrict their utility. When the condensation is performed in diethylaniline at 215° C. for five hours, only low molecular weight polymers are obtained which requires postcondensation at 400° C. in vacuo to increase the molecular weight, following which the polymer is soluble in concentrated sulfuric acid but insoluble in such practical organic solvents as dimethylacetamide dimethylsulfoxide, etc.

The high temperatures required to produce the polymers by Equation 1 preclude its use for the preparation of many substituted polybenzothiazoles, for examples those containing other secondary polymerizable groups, such as $CH_2=CH—$, $CH_2=CHCH_2—$, etc., attached either to the diphenyl ester, as 1,2,4- in $CH_2=CHC_6H_3(COOC_6H_5)_2$ or to the dimercaptoamino reactant, as in

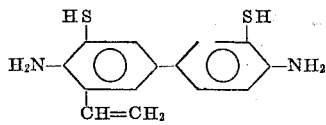

since such groups polymerize thermally independently and crosslink prematurely to give unprocessable products.

One object of this invention is to establish a novel synthesis of polybenzothiazoles which is applicable to the syntheses of new as well as to the know polybenzothiazoles. Another object of this invention is to synthesize polybenzothiazoles from solutions of practical polymer solvents which will allow the fabrication of films, fibers and laminated products, and as impregnants for porous bodies and substrates. Still another objective is to prepare precursors of the polybenzothiazoles initially in practical solvents from which they can be used directly. Other objectives of this invention will become apparent as a description of the invention proceeds.

I have discovered that these objectives can be realized and that polybenzothiazoles can be synthesized readily by the reaction in solution of a dialdehyde, $Z(CHO)_2$, with an aromatic bis-mercaptoamine,

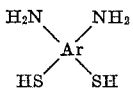

compound having a pair of ortho-disposed —$NH_2$ and SH groups. The symbols Z and Ar are more fully described hereinafter.

Unexpectedly, the polycondensation of the dialdehyde, $Z(CHO)_2$, and the bis-aminomercapto compounds,

was found to be facile, as evidenced by a rapid increase in the viscosity of the reaction mixture when performed even at room temperature in appropriate solvents. More importantly, I found that different results are obtained when the reaction is performed in the presence of oxygen in the air or in an inert atmosphere. Since polymerization mechanisms are more difficult to establish than for small molecules, an understanding of the mechanism was obtained from data using prototype monomers in non-polymeric reaction; such as from the reaction of benzaldehyde and o-mercaptoaniline, which mechanism is illustrated in Equation 2:

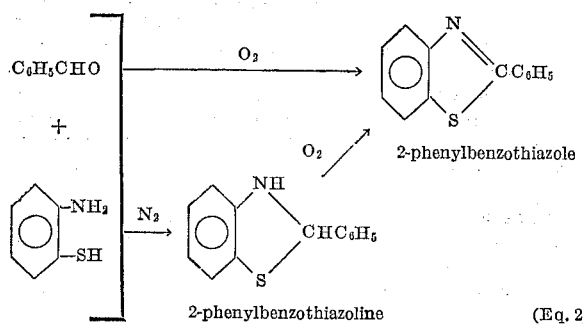

(Eq. 2)

The reactions given in Equation 2 are shown as proceeding in two stages. The first stage is a condensation reaction with the formation of a thiazoline, which then is converted to a thiazole in the second stage of oxidation. The thiazolines are sensitive to oxidation and are converted readily to thiazoles under exceptionally mild oxidation conditions such as by exposure to the oxygen of the atmosphere. Thus, if the reactions are performed while exposed to oxygen, the intermediate is not isolated but oxidized rapidly to a thiazole directly, whereas if the reactions are performed in the absence of oxidizing agents or in an inert atmosphere the thiazoline is formed and can be isolated.

I have now discovered that a similar mechanism is operative in the analogous polycondensation reactions and that dialdehydes react with bis-mercaptoamines to yield polymers according to Equation 3:

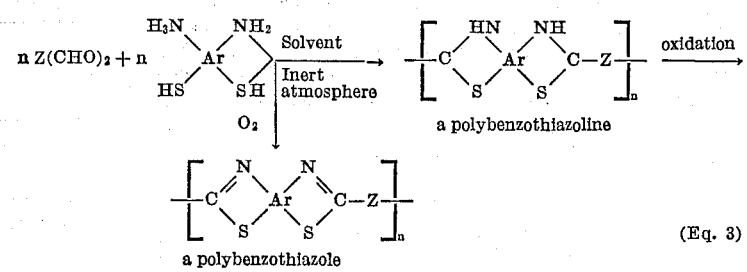

(Eq. 3)

Due to the differences between the properties of non-polymeric products of Equation 2 and of polymers, noticeable differences are observed when the process of Equation 3 is performed in an inert atmosphere or in an oxygen (air) atmosphere. For example, I have discovered that when the reaction of Equation 2 is performed in an appropriate solvent, such as in dimethylacetamide (DMAC), in the presence of incidental or deliberately introduced air, polymers are obtained which, at the early stages of the reaction, remain in solution, but which precipitate from the solution as the reaction proceeds. These DMAC-insoluble polymers are completely soluble in concentrated sulfuric acid (96% or higher) and have a relatively good molecular weight as evidenced by an intrinsic viscosity in sulfuric acid in excess of 0.30 dl./g. However, I also discovered that when the polymerization is performed under non-oxidizing conditions, the resulting benzothiazolines are completely soluble at all stages of the polycondensation, allowing the propagation to high molecular weights and the fabrication of the polymers into the desired form, such as films, fibers, etc., following which the polymer is converted to the polybenzothiazole by oxidation. For example, when films or fibers are cast or spun from the polybenzothiazoline and then dried or heated in air, oxidation to the polybenzothiazole occurs readily; or, if the film or fiber is passed through a bath containing peroxide or hypochlorite, oxidation to the thiazole structure occurs. The polybenzothiazolines of the structure,

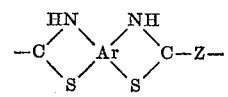

do not appear to have been reported in the literature, and thus it is another objective of this invention to prepare the new polybenzothiazolines and to convert them to polybenzothiazoles.

The polymerization reaction of Equation 3 is performed in appropriate solvents over a wide range of temperatures from about 0° C. to the boiling point of the particular solvent or mixtures of solvents, a suitable range being from 10 to 150° C. and preferably from 25 to 100° C. A particularly useful class of solvents are the normally liquid N,N-dialkylcarboxylamides of which the lower molecular weight species are preferred, for example, N,N- dimethylformamide and N,N-dimethylacetamide. Other solvents which may be used in the present invention are:

N,N-diethylformamide,
N,N-dimethylmethoxyacetamide,
N-methyl-caprolactam,
N,N-diethylacetamide,
dimethyl sulfoxide,
N-methyl-2-pyrrolidone,
tetramethylurea,
pyridine,
dimethylsulfone,
hexamethylphosphoramide,
tetramethylene sulfone,
formamide,
N-methylformamide,
butyrolactone,
N,N,N',N'-tetramethyl-alpha-ethylmalonamide,
N,N,N',N'-tetramethylglutaramide,
N,N,N',N'-tetramethylsuccinamide,
thiobis-(N,N-dimethylacetamide),
bis(N,N-dimethylcarbamylmethyl) ether,
N,N,N',N'-tetramethylfuraramide,
methylsuccinonitrile,
1,2,3-tricyanopropane,
alpha-ethylsuccinonitrile,
succinonitrile,
N,N-dimethylcyanoacetamide,
N,N-dimethyl-beta-cyano-propionamide,
dimethylester of methane disulfonic acid,
diethylester of ethane-1,2-disulfonic acid,
bis-(cyanomethyl)-sulfone,
1,2-diethiocyanopropane,
bis-(thiocyanomethyl) ether,
beta-thiocyanoisobutyronitrile,
5-hydroxy-2-piperidone,
3-hydroxy-2-pyrrolidone,
N-formyl-piperidine,
N-formylpyrrolidone,
2,2',2,2'-tetra-amino-5,5'-dimethyl-diphenylmethane,
nitronaphthol,
dimethylsulfoxide,
tetramethylenesulfoxide,
pentamethylene sulfone,
N,N-bis(cyanomethyl)formamide,
N,N'-diformyl-piperazine,
N,N-dimethylcyanamide,
N,N-dimethylaniline,
glycolonitrile,
hydracrylonitrile,
malonitrile, and
N-acetyl-2-pyrrolidone. The solvents can be used alone, in combination of solvents, or in combination with poorer solvents such as ketones such as methyl ethyl ketone, nitroalkanes such as nitroethane, nitropropane, etc., or non-solvents such as minor amounts of benzene, benzonitrile, dioxane, xylene, toluene and cyclohexane.

Any aromatic-type compound,

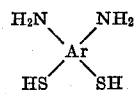

having two pairs of $NH_2$ and SH groups in which the $NH_2$ and SH groups are ortho-disposed to each other are suitable for the preparation of the compounds of this invention by reaction with dialdehydes; the only requirement of the tetra-substituted compounds used in the practice of this invention is that the pair of $NH_2$ and SH groups be detached directly to an aromatic ring.

Thus, Ar in the formulas given in Equation 3 can be the tetravalent nucleus derived from benzene, toluene, xylene, naphthalene, pyridine, quinoline, quinoxaline as well as a multiplicity of such aromatic nuclei linked directly to each other or separated by O, S, CO, $SO_2$, $CH_2$, NR, for example, NH, $NCH_3$, $NC_6H_5$, etc.; —HC=CH—, —Si—, etc., linkages or by ester linkages such as —COO—, or by imide or amide linkages such as >CON— and —CONH— etc., in which cases the $NH_2$ and —SH groups are attached to the six-membered aromatic rings, such as, for example, to the structures:

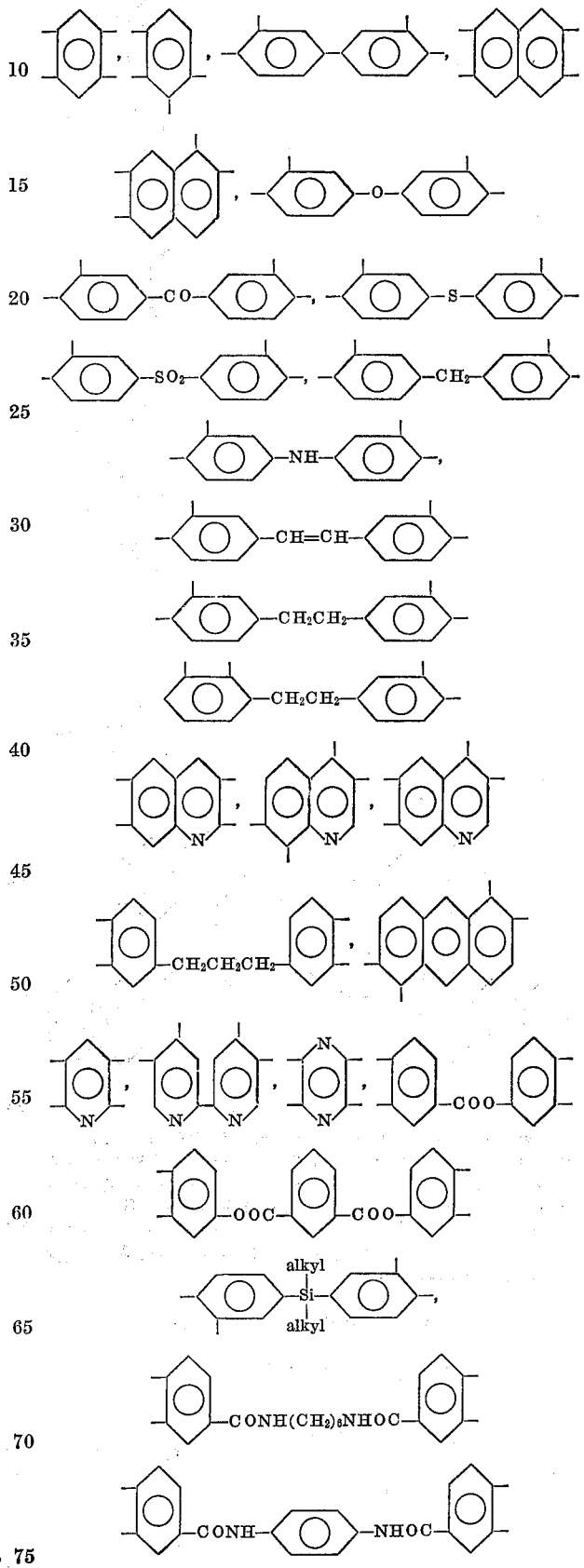

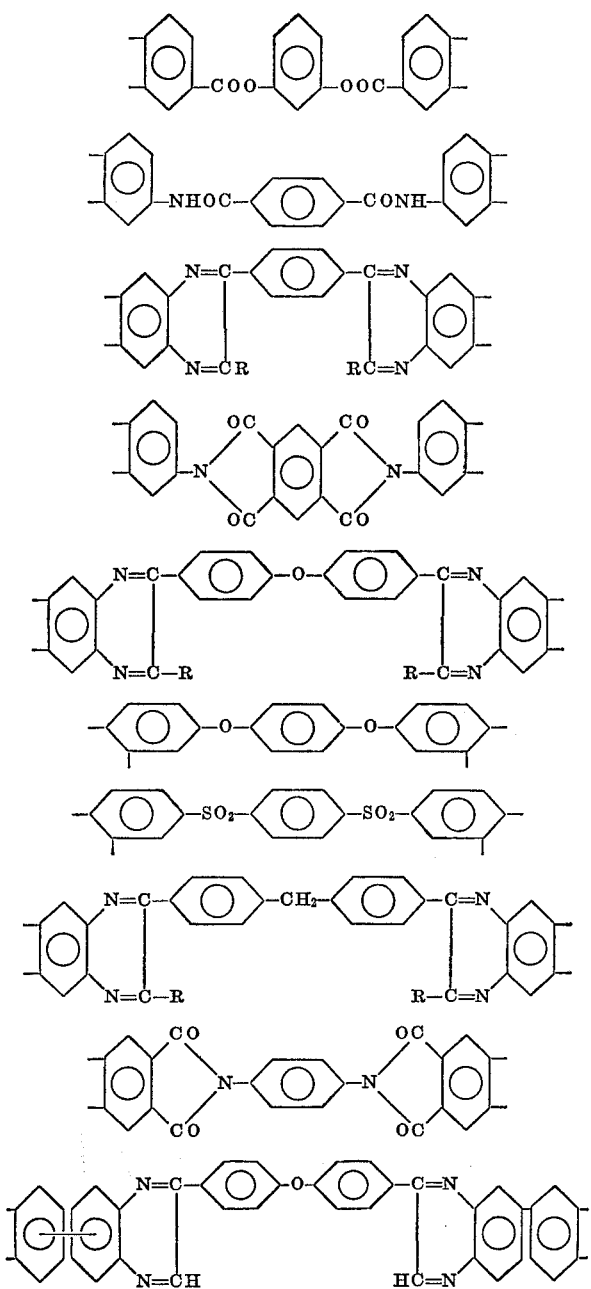

etc.

The substituents not occupied in the structures by NH₂ and SH are occupied by hydrogen or any of the substituents which normally are found on aromatic-type structures such as halogen, for example, Cl and Br, nitrile, nitro, alkoxy, aryloxy, hydrocarbon, etc., but hydrogen and halogen are preferred. A few typical examples of the above compounds are:

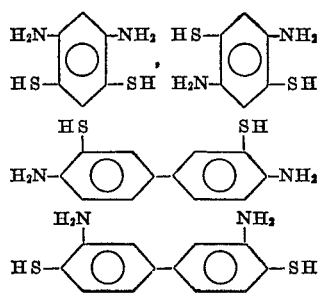

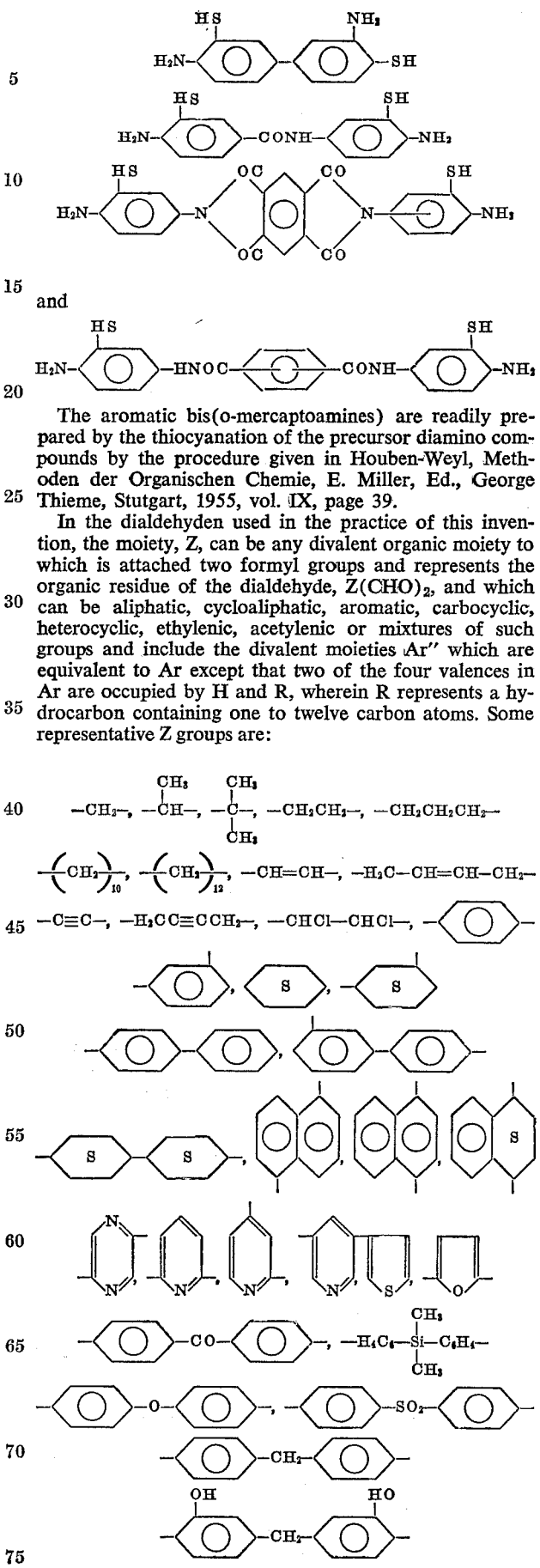

and

The aromatic bis(o-mercaptoamines) are readily prepared by the thiocyanation of the precursor diamino compounds by the procedure given in Houben-Weyl, Methoden der Organischen Chemie, E. Miller, Ed., George Thieme, Stuttgart, 1955, vol. IX, page 39.

In the dialdehyden used in the practice of this invention, the moiety, Z, can be any divalent organic moiety to which is attached two formyl groups and represents the organic residue of the dialdehyde, Z(CHO)₂, and which can be aliphatic, cycloaliphatic, aromatic, carbocyclic, heterocyclic, ethylenic, acetylenic or mixtures of such groups and include the divalent moieties Ar″ which are equivalent to Ar except that two of the four valences in Ar are occupied by H and R, wherein R represents a hydrocarbon containing one to twelve carbon atoms. Some representative Z groups are:

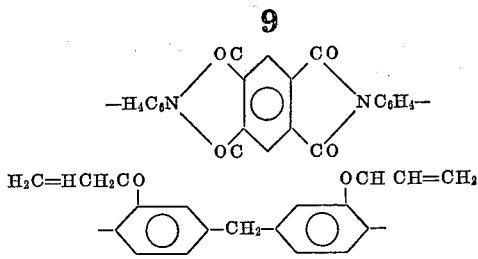

etc., among which, the aromatic-type are preferred when thermally stable polymers are desired. Some specific examples of the aromatic-type dialdehydes are:

terephthaldehyde,
isophthaldehyde,
bibenzyl-4,4'-dicarboxaldehyde,
bibenzyl-3,3'-dicarboxaldehyde,
bibenzyl-3,4'-dicarboxaldehyde,
biphenyl-4,4'-dicarboxaldehyde,
biphenyl-3,3'-dicarboxaldehyde,
biphenyl-2,2'-dicarboxaldehyde,
biphenyl-2,3'-dicarboxaldehyde,
biphenyl-2,4'-dicarboxaldehyde,
biphenyl-3,4'-dicarboxaldehyde,
naphthalene-1,4-dicarboxaldehyde,
naphthalene-1,5-dicarboxaldehyde,
naphthalene-1,8-dicarboxaldehyde,
naphthalene-2,6-dicarboxaldehyde,
naphthalene-1,7-dicarboxaldehyde,
naphthalene-2,7-dicarboxaldehyde,
diphenylether-4,4'-dicarboxaldehyde,
diphenylsulfide-4,4'-dicarboxaldehyde,
diphenylsulfone-4,4'-dicarboxaldehyde,
diphenylether-3,3'-dicarboxaldehyde,
diphenylsulfide-3,3'-dicarboxaldehyde,
diphenylsulfone-3,3'-dicarboxaldehyde,
diphenylmethane-4,4'-dicarboxaldehyde,
diphenylmethane-3,3'-dicarboxaldehyde,
benzophenone-4,4'-dicarboxaldehyde,
benzophenone-3,3'-dicarboxaldehyde,
benzophenone-3,4'-dicarboxaldehyde,
2,2-bis(4-carboxaldehydophenyl) propane,
2,2-bis(3-carboxaldehydophenyl)propane,

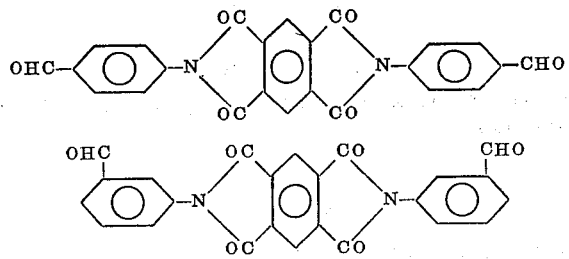

and the like

The dialdehyde may be added to the reaction mixture either as an undiluted liquid or as solid or in solution in the same solvents used for thioamine or in a different solvent in which both the thioamine and polymer are soluble.

Instead of the aldehydes, their acetal and Schiff base derivatives, capable of generating aldehydes, may be used in the practice of this invention. For example, instead of terephthaldehyde, the methyl, ethyl or butyl tetraacetals, $(RO)_2HCAr''CH(OR)_2$, may be used, in which case alcohol is eliminated instead of water, in the course of the reaction; for this reason, the acetals of alcohols of low boiling point are preferred, although those of higher boiling points are also useful. Similarly, $$(CH_3O)_2HCCH=CHCH(OCH_3)_2$$

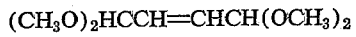

and $(CH_3O)_2CH-C\equiv C-CH(OCH_3)_2$ may be used instead of their corresponding aldehydes. Likewise, the Schiff bases, $Ar'''(CH=NR)_2$, for example, p-xylylidenemethylamine, $p-C_6H_4(CH=NCH_3)_2$ may be used instead of terephthaldehyde, in which case, methylamine, instead of water, is eliminated during the course of the reaction. For this reason, the Schiff bases of amine of low boiling point are preferred, although those of higher boiling points are also effective.

In the above formulae, R represents a hydrocarbon containing one to twelve carbon atoms; R may be aliphatic, cycloaliphatic, olefinic, aromatic, carbocyclic or heterocyclic, as exemplified by —$CH_3$, —$C_2H_5$, —$C_3H_7$,
—$CH=CH_2$, —$CH_2CH=CH_2$, —$CH_2CH=CHCH_3$
—$C_8H_{17}$, —$CH=CHCH_3$, —$CH=CHC_6H_5$, —$C_6H_5$
—$C_6H_4$—$C_6H_5$, —$C_6H_4OC_6H_5$, —$C_6H_{11}$, —$C_6H_5N$
—$CH=CH—CH=CH_2$, —$CH=CH—CH=CHCH_3$
—$C_{10}H_8$, etc.

I have discovered also that the process of this invention, allows the effective control of the molecular weight or viscosity of the polymer by a telomerization mechanism, a process which is not feasible by the prior melt polymerization techniques. This telomerization is accomplished by means of reagent molecules which are essentially monofunctional relative to propagation and prevent propagation of the polycondensation and become the terminii of the polymer chains. For example, a monoaldehyde, RCHO, will act as a telomer, and the average molecular weight of the polymer will depend on the mole ratio of dialdehyde to monoaldehyde, thus

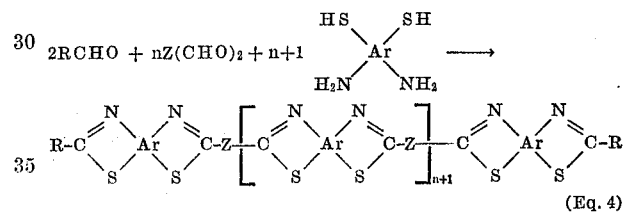

(Eq. 4)

The value of $n$ in Equation 4 can vary over a broad range from 2 to as high as 100 or 1000; preferably it is always higher than 2 and at least 20 or more.

The telomerizing aldehyde may be aliphatic, aromatic, cycloaliphatic, heterocyclic, etc., and may be an unsubstituted or substituted monoaldehyde and may contain reactive functions which are not aldehydic and which contribute additional specific properties to the polymer. For example, if the aldehyde contains a reactive vinyl or vinylidene group, such groups can be used for further reactions as vinyl compounds and polymerized or copolymerized with other vinyl monomers, as for example by radical or thermal mechanisms. As a further example, if the aldehyde contains functions, such as furfuraldehyde, that are reactive to ionic initiation, the telomerized polymer can be subjected to Lewis acid catalysis to yield insoluble, infusible, more fully condensed polymer. Still further, if the aldehyde is a diene aldehyde, such as 2,4-hexandienal, the telomerized polymer can be utilized as a bis-acceptor in Diels-Alder reactions, such as with p-phenylenedimaleimide to produce a polyamide by end-group coupling, or may be combined with diene polymers and covulcanized.

Similarly, telomerized polymers may be produced by using aromatic compounds having a single pair $NH_2$ and SH groups ortho-disposed to each other, such as o-mercaptoaniline,

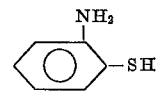

which represents the class of

in which Ar' represents the same aromatic nuclei in $$\text{HS}\overset{\text{H}_2\text{N}}{\underset{\text{A}}{\diagdown}}\overset{\text{NH}_2}{\underset{\text{SH}}{\diagup}}$$

except that only one set of ortho-disposed $NH_2$ and SH groups are present, and that the remaining bonds in $$\text{Ar'}\overset{\text{NH}_2}{\underset{\text{SH}}{\diagdown}}$$

are occupied by hydrogen or hydrocarbon groups containing one to eighteen carbon atoms, halogens such as chlorine, bromine, fluorine, nitrile, etc. groups usually found as substituents on aromatic-type nuclei. When $$\text{Ar'}\overset{\text{NH}_2}{\underset{\text{SH}}{\diagdown}}$$

compounds are used as telomers, the structure of the terminal ends of the chains are $$-\overset{\text{N}}{\underset{\text{S}}{\diagup}}\text{Ar'}$$

Aromatic compounds having one $NH_2$ group and one NHR group ortho-disposed to each other, of the formula $$\text{Ar'}\overset{\text{NH}_2}{\underset{\text{NHR}}{\diagdown}}$$

wherein R represents a hydrocarbon group containing one to twelve carbon atoms are also efficient telomerizing agents for the polymers of this invention, a few typical examples are:

$$\underset{}{\bigcirc}\overset{\text{NH}_2}{\underset{}{-\text{NHCH}_3,}} \quad \underset{}{\bigcirc}\overset{\text{NH}_2}{\underset{}{-\text{NHC}_6\text{H}_5}}$$

$$\overset{\text{NH}_2}{\underset{}{\bigcirc}}-\text{NHCH}_2\text{CH}=\text{CH}_2, \quad \text{CH}_2=\text{CH}-\underset{}{\bigcirc}\overset{\text{NH}_2}{\underset{}{-\text{NHCH}_3}}$$

$$\text{HO}-\underset{}{\bigcirc\bigcirc}\overset{-\text{NH}_2}{\underset{-\text{NHC}_2\text{H}_5}{}}$$

etc. When $$\text{Ar'}\overset{\text{NH}_2}{\underset{\text{NHR}}{\diagdown}}$$

compounds are used as telomers, the structure at the terminii of the chains is $$-\overset{\text{N}}{\underset{\text{NR}}{\diagup}}\text{Ar'}$$

High concentrations of the amino-type telomerizing agents reduce the molecular weight similarly to the monoaldehydes and the same consideration of the value of $n$ as shown in Equation 4 applies.

The ortho-diamino aromatic compounds, $$\text{Ar'}\overset{\text{NH}_2}{\underset{\text{NH}_2}{\diagdown}}$$

may also be used as telomerizing agents; however, their telomerizing efficiency is low because they tend to react to some extent with the dialdehydes to form pendant imidazole structures, $$\underset{}{\bigcirc}\overset{\overset{|}{\text{C}}}{\underset{\text{N}-\text{CH}_2-}{\diagup\text{N}}}$$

along the backbone of the chain as well as to generate imidazole terminii at the chain, as shown in my copending application, filed Nov. 10, 1970, Ser. No. 88,475. Thus, such compositions are copolymers as well as telomerized polymers.

The aromatic dialdehydes, $Ar'(CHO)_2$, in which the CHO groups are ortho-disposed to each other can also be used as telomers and yield as termini in the chains the structure, $$\text{Ar''}\overset{\text{CH}_2}{\underset{\text{C}=\text{N}}{\diagdown\text{N}\diagup}}\text{Ar}$$

A particular advantage which is offered by the practice of this invention is the preparation of azole-type copolymers by co-reacting the dialdehyde with a mixture of bis-mercapto-anilines, $$\text{HS}\overset{\text{H}_2\text{N}}{\underset{\text{Ar}}{\diagdown}}\overset{\text{NH}_2}{\underset{\text{SH}}{\diagup}}$$

and the related tetraamino compound, $$\text{R'HN}\overset{\text{H}_2\text{N}}{\underset{\text{Ar}}{\diagdown}}\overset{\text{NH}_2}{\underset{\text{NHR'}}{\diagup}}$$

in which Ar has the same meaning as above, R' represents hydrogen or a hydrocarbon, R, containing one to twelve carbon atoms and the $NH_2$ and NHR' groups are ortho-disposed to each other. The $$\text{R'HN}\overset{\text{H}_2\text{N}}{\underset{\text{Ar}}{\diagdown}}\overset{\text{NH}_2}{\underset{\text{NHR'}}{\diagup}}$$

compounds on reaction with aldehyde yield benzimidazole structures, $$-\text{C}\overset{\text{N}}{\underset{\text{R'N}}{\diagdown}}\text{Ar}\overset{\text{N}}{\underset{\text{NR'}}{\diagup}}\text{C}-\text{Z}-$$

in the backbone of the copolymers, as more fully disclosed in my copending application, filed Nov. 10, 1970, Ser. No. 88,475. The copolymers derived from $$\text{H}_2\text{N}\overset{\text{H}_2\text{N}}{\underset{\text{Ar}}{\diagdown}}\overset{\text{NH}_2}{\underset{\text{NH}_2}{\diagup}}$$

can, by adjustment of the mole ratio to $$\text{HS}\overset{\text{H}_2\text{N}}{\underset{\text{Ar}}{\diagdown}}\overset{\text{NH}_2}{\underset{\text{SH}}{\diagup}} \quad \text{and} \quad Z(CHO)_2$$

be obtained as soluble intermediates which are convertible in their final form, to insoluble, infusible copolymers.

In the practice of this invention, when it is desired to prepare and to isolate or preserve the polycondensation product in the form of a polybenzothiazoline for oxidation at a later time to the polybenzothiazole, the condensation of the dialdehyde and the bis-mercaptoaniline is performed in a non-oxidizing atmosphere, preferably in the presence of, or under a blanket of an inert gas such as $N_2$, He, Ar, Ne, Kr, $H_2$, $CH_4$, $CO_2$, etc.; for economic reason nitrogen is preferred. Partial or complete oxidation of the polybenzothiazoline is achieved readily by air even at room temperature but is accelerated at higher temperatures of the order of 50 to 350° C., and more readily by the use of oxygen, which can be pure oxygen or oxygen mixed with an inert gas at 30 to 50% or higher concentrations. Though other oxidizing reagents can be used, such as hydrogen peroxide, benzoyl peroxide, sodium hypochloride, chlorine dioxide, ammonium persulfate, etc., in aqueous or appropriate solvent systems, no particular technical advantage accrues from their use. For economic reason, air is the preferred oxidizing agent.

When oxygen is used as the oxidizing agent in the process of this invention, it can be oxygen itself or other oxygen-containing gases such as air or oxygen mixed with inert gases such as nitrogen, helium, argon, krypton, xenon, etc., or with gases which are not reactive with the reagents in the system, such as carbon monoxide, methane, ethane, propane, etc.

Another particular and useful advantage is offered by the process and practice of this invention is the relative ease by which either random or block copolymers are prepared by using two or more different

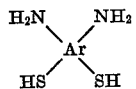

compounds, with one or more aldehydes, $Z(CHO)_2$; or two or more aldehydes, $Z(CHO)_2$, with one or more

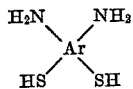

Block copolymers are prepared by first reacting, for example, less than one mole of dialdehyde with one mole of

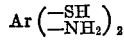

followed by the addition of a second dialdehyde, or by first reacting one dialdehyde with one

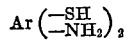

followed by the addition of a different

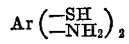

which is then reacted with the same or a different dialdehyde.

Alternately $(n+1)$ moles of a

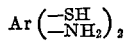

compound are reacted with $n$ moles of one dialdehyde, to yield an aminomercapto-terminated chain; separately, $n$ moles of another

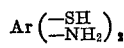

compound are reacted with $(n+1)$ moles of the same or different dialdehyde to yield aldehyde-terminated chains; then the solutions of the aminomercapto-terminated chains and of the aldehyde terminated chains are mixed and the reaction continued.

Also, copolymers are easily prepared by introducing into the mixture other aldehyde-reactable amino compounds such as m- and p-phenylenediamine, 4,4'-diaminodiphenyl, 4,4'-diaminodiphenyl oxide and the like, which introduce Schiff-base linkages,

into the polymer.

The above copolymers, by the process of this invention, are obtained in solution as soluble intermediates which, in their final form, are either free of crosslinkages or which are convertible to crosslinked, insoluble, infusible copolymers in their final form by adjustment of the mole ratio of

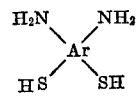

used to the other copolymerizing monomers, such as

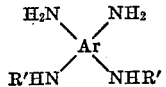

when R' is H or an olefinic or acetylenic hydrocarbon.

In some cases, the polymer as prepared in solution, and when isolated as a powder, film or fiber by precipitation or by evaporation of the solvent, as for example, at 130–135° C., may contain some unconverted benzimidazolines as well as complexed solvent which may detract from the physical properties of the polymers. The maximum properties of the polymer are readily developed by post-heating at elevated temperatures in excess of 175° C., preferably in the range of 250–400° C. in nitrogen, or 250–350° C. in air. In all cases, however, post heat-treatment is beneficial in eliminating residual solvent and chain extending the polymerization. Post-heated polymers, particularly those in film- and fiber-form, can be converted to shaped chars by slowly and progressively heating the polymer in an inert atmosphere at higher temperatures, up to 1200° C.

The particular process of this invention does not appear to be a general one, and while it has been established as operative for the bis-aminothiophenols,

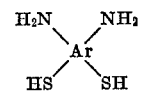

the corresponding bis-phenols,

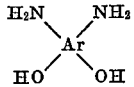

do not, when reacted with dialdehydes, $3(CHO)_2$, yield a polybenzoxazole; rather the polymeric Schiff base,

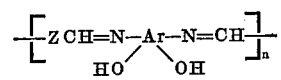

is obtained which could not be cyclized to the oxazole polymer,

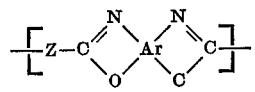

even by strong chemical oxidizing agents at elevated temperatures.

The polymers of this invention are particularly useful in the preparation of thermally stable heat-resistant fibers, laminated products, molded objects, varnishes for wire, impregnants for porous bodies, including foams and leathers, honeycombs, etc. The practice of this invention is illustrated in the following examples which illustrate both the prototype reactions and the synthesis of polymers.

PROTOTYPE REACTIONS (A) Preparation of 2-phenylbenzothiazoline.—Into a 250-ml. reaction vessel equipped with a Dean-Stark trap and water condenser is placed o-mercaptoaniline (4.32 g., 34.5 mmoles), benzaldehyde (3.48 ml., 34.5 mmoles), and 100 ml. dry benzene. The reaction flask is purged with deoxygenated nitrogen, sealed under a positive nitrogen pressure, and heated to reflux until 0.28 ml. of water is collected in the Dean-Stark trap. The solvent is distilled under a nitrogen atmosphere to yield an oily product which partially crystallizes on standing. It is recrystallized from Skelly Solve "F" to yield 2-phenylbenzothiazoline, M.P. 108° C.; IR (KBr disc), 3330 cm.$^{-1}$ (NH), 3040 cm.$^{-1}$ (aromatic CH), no C=N absorption was present; NMR (CDCl$_6$/TMS), 7.5–6.4$\delta$ (9H, m.), 6.20$\delta$ (1H, s.), 4.09$\delta$ (1H, broad singlet).

Substitution of benzaldehyde in this example by other aldehydes such as acetaldehyde, acrolein, crotonaldehyde, heptaldehyde, naphthaldehyde, trichlorobenzaldehyde, p-cyanobenzaldehyde, hexahydrobenzaldehyde, trichloroacetaldehyde, etc., yield the corresponding 2-substituted-benzothiazoline.

(B) Preparation of 2 - phenylbenzothiazole.—Into a 250-ml. reaction vessel equipped with a Dean-Stark trap and reflux condenser open to air is placed o-mercaptoaniline (4.32 g., 34.6 mmoles), benzaldehyde (3.48 ml., 34.5 mmoles), and 100 ml. dry benzene. The reaction solution is heated at reflux until 0.48 ml. water is collected in the Dean-Stark trap. The solvent is evaporated, yielding an oil which crystallizes on standing. Recrystallization of the product from 50% ethanol/water yields 2-phenylbenzothiazole, M.P. 113–114° C.; IR (KBr disc), 1600 cm.$^{-1}$ (C=N), 3040 cm.$^{-1}$ (aromatic CH), no absorption above 3040 cm.$^{-1}$; NMR (CDCl$_6$/TMS), 8.2–7.1$\delta$ (m).

Substitution of the benzaldehyde in this example by other aldehydes such as acetaldehyde, acrolein, crotonaldehyde, heptaldehyde, naphthaldehyde, trichlorobenzaldehyde, p-cyanobenzaldehyde, hexahydrobenzaldehyde, etc., yields the corresponding 2-substituted-benzothiazole.

(C) Preparation of 2,2' - p - phenylene - bis - benzothiazoline.—Into a 250 ml. reaction vessel equipped with a Dean-Stark trap and a reflux condenser is placed o-mercaptoaniline (1.99 g., 15.9 mmoles), terephthaldehyde (1.07 g., 7.9 mmoles), and 110 ml. anhydrous benzene. The reaction mixture is purged with deoxygenated nitrogen, sealed under a positive nitrogen pressure, and heated to reflux until 0.12 ml. water is collected in the Dean-Stark trap. Filtration of the cooled reaction mixture yields a cream-colored crystalline 2,2' - bis - benzothiazoline, M.P. 125–126° C. (in air), 148° C. (DTA, 15° C./min., N$_2$); IR (KBr disc), 3340 cm.$^{-1}$ (NH), 3030 cm.$^{-1}$ (aromatic CH), 2920 cm.$^{-1}$ (aliphatic CH), no C=N absorption was evident; NMR (DMSO-d$_6$/TMS), 8.20–6.55$\delta$ (6H, m), 6.24$\delta$ (1H, s.).

Analysis.—Calc'd for C$_{20}$H$_{16}$N$_2$S$_2$ (percent): C, 68.96; H, 4.63; N, 8.04; S, 18.40. Found (percent): C, 68.88; H, 4.77; N, 7.97; S, 18.38.

Substitution of the terephthaldehyde of this example by other aldehydes such as malonyldialdehyde, hexamethylenedialdehyde, hexadecamethylenedialdehyde, the xylylenedialdehydes, the hexahydrophthaldehydes, the phenylenedicrotonaldehydes, etc., yields the corresponding benzothiazolines.

(D) Preparation of 2,2' - p - phenylene - bis - benzothiazole.—Into a 250-ml. reaction vessel equipped with a Dean-Stark trap and a reflux condenser open to air is placed o-mercaptoaniline (1.99 g., 15.9 mmoles), terephthaldehyde (1.07 g., 7.9 mmoles), and 110 ml. dry benzene. The reaction mixture is heated to reflux until 0.21 ml. water is collected in the Dean-Stark trap. The solvent is evaporated, yielding 2,2'-p-phenylene-bis-benzothiazole as a light-yellow powder which, upon washing with ethanol, melts at M.P. 261–262° C.; IR (KBr disc), 3030 cm.$^{-1}$ (aromatic CH), 1600 cm.$^{-1}$ (C=N), no NH absorption was in evidence.

Substitution of the terephthaldehyde of this example by other aldehydes, such as glutaryldialdehyde, malonyldialdehyde, hexamethylenedialdehyde, hexadecamethylenedialdehyde, the xylylenedialdehydes, the hexahydrophthaldehydes, the phenylene-dicrotonaldehydes, etc., yields the corresponding bis-benzothiazoles.

(E) Preparation of 2,2 - diphenyl - 6,6' - bibenzothiazole.—Into a 50-ml. reaction vessel equipped with a Dean-Stark trap and water condenser is placed 3,3'-dimercaptobenzidine (0.325 g., 1.31 mmoles), benzaldehyde (0.278 g., 2.72 mmoles), and 20 ml. anhydrous benzene, which had been purged of oxygen with deoxygenated nitrogen. The reaction mixture is purged with nitrogen, sealed under a positive nitrogen pressure, and heated to reflux for two hours, after which time 0.04 ml. water is collected. A slow evaporation of the solvent as air is passed through the solution, and yields a yellow solid which, after recrystallization from 70% ethanol/benzene, gives 2,2' - diphenyl - 6,6' - bibenzothiazole, M.P. 238° C. (DTA, 15° C./min., N$_2$); IR (KBr disc), 1600 cm.$^{-1}$ (C=N), no NH absorptions were present.

Substitution of the benzaldehyde in this example by other aldehydes such as acetaldehyde, acrolein, crotonaldehyde, heptaldehyde, naphthaldehyde, trichlorobenzaldehyde, p-cyanobenzaldehyde, hexahydrobenzaldehyde, etc., yields the corresponding 2,2' - disubstituted-6,6'-bis-benzothiazoles.

(F) Oxidation of 2 - phenylbenzothiazoline.—A 0.5 sample of 2-phenylbenzothiazoline is dissolved in 10 ml. 95% ethanol in a 25-ml. flask, equipped with a reflux condenser open to air. The solution is heated to reflux for three hours while the flask remains open to the air. The solvent is evaporated and the product dried in vacuo to yield 2-phenylbenzothiazole, M.P. 113–114° C.; the product is identified by the mixed melting point technique with an authentic sample of Example B. When air is passed through the refluxing solution, the oxidation, and the reaction is terminated after twenty minutes and the same 2-phenylbenzothiazole is isolated.

Substitution of the 2-phenylbenzothiazoline of this example by the other 2-substituted-benzothiazolines of Example A yields the corresponding 2-substituted benzothiazoles.

(G) Oxidation of 2,2'-p-phenylene-bis-benzothiazoline.—A 0.20 g. sample of 2,2'-p-phenylene-bis-benzothiazoline is dissolved in 10 ml. of a 50–50 DMSO-ethanol mixture and placed into a 25-ml. flask equipped with a reflux condenser open to air. The solution is warmed to 70° C. as oxygen is passed through the solution. Filtration of the cooled solution yields 2,2'-p-phenylene-bis-benzothiazole, M.P. 258–260° C. The product is identified by a comparison of its infrared spectrum with that of an authentic sample of Example D.

Substitution of the 2,2'-p-phenylene-bis-benzothiazolines of this example by the other bis-benzothiazolines of Example C yields the corresponding bis-benzothiazoles.

(H) Substitution of 3.09 parts of the tetrabutylacetal of terephthaldehyde (C$_4$H$_9$)$_2$HCC$_6$H$_4$CH(OC$_4$H$_9$)$_2$, for the terephthaldehyde of Example D and performing the condensation in the presence of air yields 2,2'-p-phenylene-bis-benzothiazole.

(I) Substitution of 0.324 part of benzylidenemethylamine, C$_6$H$_5$CH=NCH$_3$ for the benzaldehyde of Example E yields 2,2'-diphenyl-6,6'-bibenzothiazole.

POLYMERIZATIONS

Example 1

Into a reaction vessel equipped with a stirrer, reflux condenser, inert gas inlet and outlet, heating and cooling means is placed 41.33 parts of 3,3'-dimercaptobenzidine, while the apparatus is being purged with nitrogen. Then 22.33 parts of terephthaldehyde and 560 parts of anhydrous dimethylacetamide is added and the reaction mixture stirred at room temperature and maintained under a positive nitrogen pressure. On stirring, a yellow homogeneous solution is obtained which becomes increasingly viscous with time. Aliquots withdrawn at ten-minute intervals are precipitated in 95% ethanol, dried, and their intrinsic viscosities determined in concentrated sulfuric acid at 20° C. Four aliquots can be removed before the solution becomes too viscous to withdraw other aliquots. The intrinsic viscosities of the first four aliquots are

| Sample | Time/ minutes | Intrinsic viscosity |
|---|---|---|
| 1 | 10 | 0.57 |
| 2 | 20 | 0.80 |
| 3 | 30 | 1.03 |
| 4 | 40 | 1.10 |

Films cast from these solutions are yellow-orange in color and very flexible after drying at 135° C. for one hour, and at 250° C. for twelve hours in air. The infrared spectra of these films are identical to that of an authentic sample prepared by the melt method from the diphenylphthalate ester and dimercaptobenzidine.

After heating at 250° C., the intrinsic viscosity of the polymers increases and the value for sample number 4 increases from 1.10 to 1.84 dl./g. in concentrated sulfuric acid. Before heating at 250° C., the infrared spectra of the polymer samples show NH absorptions at 3350 and 1550 cm.$^{-1}$, indicating the presence of thiazoline structures; after heating in air these absorptions are absent. In the intermediate stages, both polybenzothiazoline and polybenzothiazole structures are present in the polymers.

Example 2

A mixture of 1.78 parts of 3,3'-dimercaptobenzidine and 0.9615 part of terephthaldehyde in 18 parts of anhydrous deoxygenated dimethylacetamide are reacted under a nitrogen atmosphere by the procedure of Example 1. The intrinsic viscosity of a sample isolated after sixty minutes is 1.04 dl./g. in concentrated sulfuric acid at 20° C. A film prepared from the homogeneous solution after reaction for one hour at ambient temperature is flexible, and yellow-orange in color when dried at 135° C. for one hour and at 250° C. for twelve hours. The elemental analysis for the sample dried at 250° C. is C, 70.71; H, 3.45; N, 8.08; S, 18.44, which is in very close agreement with the theoretical values for the high molecular weight polymer, $(C_{20}H_{10}N_2S_2)_n$. Thermogravimetric analyses (TGA) of this polymer performed at a heating rate of 15° C./min. show inflection points of 610° C. in nitrogen and 550° C. in air compared to 580° C. in nitrogen and 530° C. in air for a sample prepared by the melt-phenylester technique.

Instead of dimethylacetamide, solutions of the polymer may be prepared in dimethylformamide, dimethylsulfoxide, butyrolactone, meta-cresol, and tetramethylurea.

Example 3

The procedure of Example 2 is repeated except that 2.93 parts of dimercaptobenzidine dihydrochloride in 38 parts of dimethylacetamide and 2.6 parts of diethylamine are used to generate the dimercaptobenzidine in situ before reaction with 1.5824 parts of terephthaldehyde. The reaction is performed at room temperature and films, identical to those obtained in Example 2, can be cast from the solution after fifteen minutes of reaction.

Example 4

A series of modified, telomerized polybenzothiazoles are prepared by using o-mercaptoaniline as the telomerizing agent by the following typical procedure in which 10 mole percent of telomer is used.

Into a suitably equipped reaction vessel there is placed, under a nitrogen atmosphere, 1.6202 g. (6.528 mmoles) of 3,3'-dimercaptobenzidine and 0.76 g. (1.687 mmoles) o-aminobenzenethiol. Then there is added 0.921 g. (6.872 mmoles) of terephthaldehyde in 25 parts of anhydrous deoxygenated dimethylacetamide. The reaction vessel is sealed under a positive nitrogen atmosphere and stirred for three hours at the ambient temperature, yielding a honey-yellow viscous solution. An aliquot sample is withdrawn, precipitated in 95% ethanol, dried in vacuo; its intrinsic viscosity in concentrated sulfuric acid at 20° C. is 0.45 dl./g. A second aliquot is heated under a nitrogen atmosphere at 80° C. for fifteen hours, yielding a viscous solution; the polymer isolated from this solution has an intrinsic viscosity of 0.48 dl./g. A third aliquot is heated at 80° C. for fifteen hours while exposed to air, yielding a yellow precipitated polymer which is isolated and dried; its intrinsic viscosity was 0.50 dl./g. The infrared spectra of the samples heated in air are devoid of adsorptions for thiazoline at 3350 and 1550 cm.$^{-1}$, which are present in the fractions not exposed to air.

The intrinsic viscosities of the polymers as a function of the concentration of telomer decreases with an increase in concentration of telomer as follows:

| Mole percent of teleomer | Intrinsic viscosity of polymers aliquots | | |
|---|---|---|---|
| | Original | Heated in nitrogen | Heated in air |
| 2 | 0.90 | 0.92 | 1.20 |
| 4 | 0.66 | 0.70 | 0.96 |
| 6 | 0.54 | 0.60 | 0.66 |
| 10 | 0.45 | 0.48 | 0.50 |
| 20 | 0.33 | 0.35 | 0.36 |

Films are cast from these solutions and the inflection points of the polymers determined by TGA in nitrogen and in air are found to decrease with an increase in the concentration of telomer demonstrating the decrease in molecular weight. However, the stabilities of these telomerized polymers are outstandingly high; thus

| Mole percent telomer | Atmosphere | Inflection point, ° C. |
|---|---|---|
| 0 | Nitrogen | 610 |
| 0 | Air | 550 |
| 2 | Nitrogen | 600 |
| 2 | Air | 520 |
| 6 | Nitrogen | 580 |
| 6 | Air | 460 |
| 10 | Nitrogen | 560 |
| 10 | Air | 410 |
| 20 | Nitrogen | 535 |
| 20 | Air | 400 |

Example 5

Example 4 was repeated using equivalent amounts of benzaldehyde instead of o-mercaptoaniline as the telomerizing agent. Within the limits of experimental error, the intrinsic viscosities and the TGA inflection points paralleled the data of Example 4; thus

| Mole percent of telomer | [η] of aliquot heated in nitrogen | TGA point | Inflection, ° C. |
|---|---|---|---|
| 2 | 0.90 | N² | 600 |
| 2 | | Air | 520 |
| 4 | 0.67 | N² | 590 |
| 4 | | Air | 530 |
| 6 | 0.56 | N² | 575 |
| 6 | | Air | 455 |
| 10 | 0.45 | N² | 560 |
| 10 | | Air | 410 |
| 20 | 0.32 | N² | 535 |
| 20 | | Air | 400 |

Instead of the benzaldehyde of this example, there may be used as the telomerizing agent an equivalent amount of acetaldehyde, heptaldehyde, naphthaldehyde, cyanobenzaldehyde, hexahydrobenzaldehyde, acetamidobenzaldehyde, o-anisaldehyde, 9-anthraldehyde, 4-carboxyethylbenzaldehyde, salicylaldehyde, 3,4-dichlorobenzaldehyde, 4-(diethylamino)-benzaldehyde, 5-indancarboxaldehyde, mesitaldehyde, 1-pyrenecarboxaldehyde, syringaldehyde, chloral, 2-ethylhexanal, glyceraldehyde, cinnamaldehyde, phenylacetaldehyde, phenylpropargylaldehyde, furfuraldehyde, indole-3-carboxaldehyde, N-methylpyrrole-2-carboxaldehyde, 5-methyl-2-thiophenecarboxaldehyde, 2-thiophenecarboxaldehyde, 3-cyclohexen-1-carboxaldehyde, 2-pyridinecarboxaldehyde, 5-norbornene-2-carboxaldehyde, acrolein, methacrolein, vinylbenzaldehyde, crotonaldehyde.

Example 6

The procedure of Example 4 is repeated using an equivalent amount of N-methyl-o-phenylenediamine, $$o\text{-}H_2NC_6H_4NHCH_3$$

instead of o-emrcaptobenzidine at concentrations of 2, 4 and 10 mole percent of telomer to yield soluble polymers of intrinsic viscosities in concentrated sulfuric acid of 0.88, 0.71 and 0.50 respectively, with TGA inflections of 602, 583 and 560° C. respectively. Substantially identical values are obtained when N-phenyl-o-phenylenediamine, $$o\text{-}H_2NC_6H_4NHC_6H_5$$

is used instead of N-methyl-o-phenylenediamine.

Example 7

Example 5 is repeated using an equivalent amount of p-vinylbenzaldehyde, $CH_2=CHC_6H_4CHO$, as the telomerizing agent instead of benzaldehyde to give polymers similar in viscosity to those of Example 5 except that the end-groups contain the styryl moiety, $$CH_2=CHC_6H_4C\underset{S-}{\overset{N-}{\diagup}}$$

in both the benzothiazoline and the benzothiazole polymers, thus:

$$CH_2=CHC_6H_4-C\underset{S}{\overset{N}{\diagup}}\underset{S}{\overset{N}{\diagdown}}Ar\underset{S}{\overset{}{\diagup}}C-R-\left[-C\underset{S}{\overset{N}{\diagup}}\underset{S}{\overset{N}{\diagdown}}Ar\underset{S}{\overset{}{\diagup}}C-R-\right]_n-C\underset{S}{\overset{N}{\diagup}}\underset{S}{\overset{N}{\diagdown}}Ar\underset{S}{\overset{}{\diagup}}C-C_6H_4CH=CH_2$$

The thermal treatment of these polymers alone or in the presence of radical generating catalysts, such as benzoyl peroxide, tertiary butyl perbenzoate, tertiary butyl peracetate, cumene hydroperoxide and the like, yields polymers cross-linked through the vinyl groups.

To a solution in DMAC of the polymer containing 20 mole percent of p-vinylbenzaldehyde of intrinsic viscosity of 0.35 dl./g., is added 0.5% by weight of the polymer of tertiary butyl perbenzoate; films are cast on glass and dried in air at 135° C. for four hours, at 175° C. for four hours, at 250° C. for twelve hours. The resulting film is insoluble in concentrated sulfuric acid.

Example 8

The procedure of Example 3 is used to react 27.28 parts of 3,3'-dimercaptobenzidine, 13.40 parts of terephthaldehyde and 1.92 parts of furfuraldehyde in 250 parts of dimethylacetamide. To the solution is added 0.5 part of zinc chloride and films cast by the procedure given in Example 7; the final films are insoluble in concentrated sulfuric acid as a result of further polymerization through the terminal furane rings.

Example 9

Substitution of 1.92 parts of 2,4-hexadienal, $$CH_3CH=CH-CH=CHCHO$$

for the furfuraldehyde of Example 8 yields polymers terminated with $$CH_3CH=CH-CH=CHC\underset{S-}{\overset{N-}{\diagup}}$$

groups which are useful in post-reactions such as in end-coupling reactions, etc., as for example, by reaction with p-phenylenedimaleimide, $$\underset{HCCO}{\overset{HCCO}{\diagdown}}NC_6H_4N\underset{OCCH}{\overset{OCCH}{\diagup}}$$

To the solution at 50° C., of the polymer of this example, intrinsic viscosity 0.73 dl./g., is added 2.65 parts of p-phenylenedimaleimide in 50 parts of dimethylacetamide and an immediate increase in viscosity is observed as a result of a bis-1,4-Diels-Alder addition of the dimaleimide to the diene telomerized polymer.

Example 10

Substitution of 2.14 parts of 2-pyridinecarboxyaldehyde for the furfural of Example 8 yields a polymer telomerized by pyridine groups which make it receptive to acid dyes.

Example 11

The procedure of Example 2 is repeated using 1.34 g. of terephthaldehyde, 4.10 g. of $$\left[m\text{-}C_6H_4\left[CONHC_6H_3\underset{NH_2}{\overset{SH}{\diagup}}\right]_2\right]$$

in 40 parts of dimethylacetamide and a polymer containing the repeating unit,

[structure of repeating unit with benzothiazole and amide linkages]

is obtained. The dimercaptoamine is prepared by the reaction of $m\text{-}C_6H_4(COOC_6H_5)_2$ and $$H_2N-\underset{}{\overset{SH}{\diagup}}C_6H_3-NO_2$$

followed by catalytic reduction.

Example 12

The procedure of Example 11 is repeated using 4.62 g. of the diimide, $$HS\underset{H_2N-C_6H_3}{\diagup}-N\underset{OC}{\overset{OC}{\diagup}}\underset{CO}{\overset{CO}{\diagdown}}C_6H_4\underset{OC}{\overset{OC}{\diagup}}\underset{CO}{\overset{CO}{\diagdown}}N-C_6H_3\underset{}{\overset{SH}{\diagdown}}-NH_2$$

instead of the amide of Example 11 and there is obtained a polymer containing the repeating unit

[structure of repeating unit with benzothiazole and pyromellitimide linkages]

The dimercaptoamine is prepared from pyromellitic anhydride and $$H_2N-\underset{}{\overset{SH}{\diagup}}C_6H_3-NO_2$$

followed by cyclization and reduction.

Example 13

The procedure of Example 2 is repeated using 2.49 g. of 3,3'-dimercaptobenzidine, 4.177 g. of

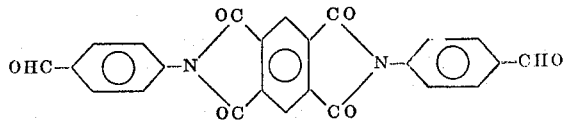

in 60 parts of dimethylacetamide and there is obtained a polymer containing the repeating unit

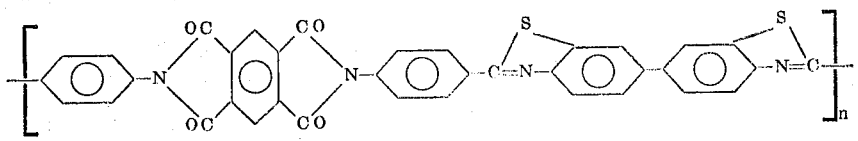

Example 14

The procedure of Example 1 is repeated using 46.92 parts of the tetraethylacetal, p-$C_6H_4$[CH(O$C_2H_5$)$_2$]$_2$ instead of terephthaldehyde, and a polymer substantially identical to that of Example 1 is obtained.

Example 15

The procedure of Example 1 is repeated using 26.63 parts of p-xylylidenemethylamine, p-$C_6H_4$(CH=NC$H_3$)$_2$ instead of terephthaldehyde and a polymer equivalent to that of Example 1 is obtained.

Example 16

A mixture of 24.8 parts of 3,3'-dimercaptobenzidine and 10.12 parts of glutaric aldehyde in 350 parts of dimethylformamide are reacted by the procedure of Example 1, to give a polymeric thiazoline in which Z is -(CH$_2$)$_3$- which, on exposure to air, is converted to oxidation to the polymeric thiazole. A similar product is obtained when 24.9 parts of the glutaric diethyl acetal derivative is used instead of the glutaric dialdehyde.

Example 17

The procedure of Example 1 is repeated using 223.2 parts of 3,3'-dimercaptobenzidine, (0.9 mole), 21.4 parts of 3,3'-diaminobenzidine and 147.4 parts (1.1 mole) of terephthaldehyde and crosslinked, infusible films are obtained when cast and treated at 200° C. for two hours, due to the formation of p-xylylene bridges between the imidazole linkages in the copolymer.

Example 18

A reticulated polyurethane foam having 40 pores per square inch is impregnated and coated with the polymer solution of Example 1 and dried at 135° C. for four hours, and at 175° C. for twelve hours, giving an increase in weight of approximately 14%. The impregnated and coated reticulated foam retains its shape when heated to 200° C. whereas an unimpregnated control sample distorts and collapses, losing its identity while undergoing serious degradation. When the control sample is immersed in kerosene at 100° C. it disintegrates within three hours, whereas the impregnated sample remains undamaged.

By repeating immersion in the polymer solution, increased amounts of polymer are deposited on the reticulated foam to structures containing 50% or higher of the polymers. Such compositions can be heat-treated to progressively higher temperatures in an inert atmosphere, as for example, up to 700–800° C., to produce reticulated char structure on which pyrolytic graphite can be deposited.

Example 19

The procedure of Example 1 is repeated and the polymer solution transferred to a dip-tank blanketed with nitrogen; then copper wire is passed continuously through the solution to coat it. The coated wire is then passed through a forced-air heated oven, the first section of which is heated to 150° C., then to a second section heated to 250° C., and through a third section heated to 300° C. The dried coated wire can be wound on a 0.25 inch mandrel without rupture of the coating. The coated wire is then random-wound on an uninsulated metal spool and connected in series with a 100 volt AC current to one lead of an electric bulb, the other lead of which is connected through a fuse to the grounded side of the line. The core of the metal spool is also connected through the same fuse to the grounded side of the line so that if insulation failure occurs, the fuse will be blown and the light would cease to operate. The random-wound coil is placed in an oven heated to 225° C.; no failure is observed within a period of ninety days.

Example 20

The procedure of Example 1 is repeated and the solution is filtered while maintained in the absence of air and then is concentrated in a falling film evaporator at 0.1 mm. to a concentration of approximately 28% of polybenzoxazoline and extruded through the orifice of a fine hypodermic needle into 50% dimethylacetamide-50% water mixture to yield continuous fibers which are washed with water until free of solvent and dried at 110° C. in air. The oxidation is completed by drying in air at 170° C. and by drawing at 220° C. in air. Soft, ductile fibers are obtained.

Example 21

The procedure of Example 1 is repeated except that 45.0 parts of tetrachloroterephthaldehyde is used instead of the terephthaldehyde, and a self-extinguishing flame-retardant polymer is obtained.

Example 22

The procedure of Example 1 is repeated except that the terephthaldehyde, dissolved in 100 parts of dimethylacetamide is added over a period of fifteen minutes to the solution of the dimercaptobenzidine in 460 parts of dimethylacetamide heated to 100° C. and a viscous solution of the polymer is obtained.

Example 23

The procedure of Example 1 is repeated except that the reaction is performed while the solution is exposed to incidental amounts of air through the open condenser, and in twenty minutes, polymer precipitates from the solution. Its intrinsic viscosity in concentrated $H_2SO_4$ is 0.36.

Example 24

The following example illustrates the formation of polymers in this invention terminated by mercaptoamine by reaction of $n$ moles of Z(CHO)$_2$ with $n+1$ moles of the bis-mercaptoamine, in which $n$ has a value of at least one, and may be as high as ten to twenty, to yield products having the general structure

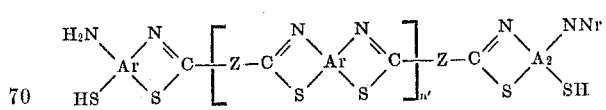

wherein $n'=n-1$.

(a) In this specific example the mole ratio of Z(CHO)$_2$ to the mercaptoamine is 5:6. The procedure of Example 2 is used to react 14.88 parts of 3,3'-dimercaptobenzidine in 250 ml. of DMAC with 6.70 parts of terephthaldehyde in 60 ml. of DMAC at 110° C. for sixty minutes and a polymer solution of low viscosity and of low molecular weight is obtained which is stable over long periods of time, when preserved in an inert atmosphere. These low viscosity solutions are particularly suitable as impregnants for porous bodies such as wood, as well as paper, cloth, etc., in the form of sheets, honeycombs, etc. The polymer contains terminal mercaptoamino groups which, however, can be end-coupled to yield high molecular weight products. End-coupling is readily achieved by reaction with additional quantities of polycarbonyl compounds such as another dialdehyde, $$Z(CHO)_2$$

or any other suitable coupling or crosslinking reagent such as polyisocyanate, polyepoxy compounds, polycarboxylic acid anhydrides, etc., for example, toluene diisocyanate, bis-phenyldiglycidyl ether, pyromellitic dianhydride, etc.

(b) To the solution of Example 24a is added 1.34 parts of terephthaldehyde dissolved in 10 parts of DMAC and mixed thoroughly. A sample of the solution cast and heated at 100° C. for two hours, at 125° C. for two hours, at 200° C. for one hour and at 250° C. for twelve hours yields a non-brittle film.

(c) Instead of 1.34 parts of terephthaldehyde as in Example 24b above, there is added 0.60 part of glyoxal in 10 parts of DMAC and a film is obtained when the solution is cast as a film and heated as in 24b above.

Example 25

This example illustrates the formation of the polymers terminated by aldehyde functions by reaction of $n+1$ moles of $Z(CHO)_2$ with $n$ moles of the bismercaptoamine, in which $n$ has a value of at least one and may be as high as ten or twenty, to yield products having the general structure.

wherein $n'=n-1$. This product is analogous to and the counterpart of the mercaptoamine-terminated products of Example 24a. In this example the mole ratio of $Z(CHO)_2$ to the mercaptoamine is 6:5. The procedure of Example 2 is used to react 12.20 parts of 3,3'-dimercaptobenzidine in 250 ml. of DMAC with 8.04 parts of terephthaldehyde in 64 parts of DMAC at 110° C. for thirty minutes to yield a solution of low viscosity. The polymer contains terminal CHO groups which can be coupled or extended by reaction with additional quantities of the original 3,3'-dimercaptobenzidine, or by 3,3'-diaminobenzidine or in general by any of the compounds, as well as by diamino compounds such as m- or p-phenylenediamine and the like, or by any polyfunctional reagent which reacts with carbonyl compounds. Particularly, the dialdehyde-terminated polymers are useful for reaction with the dimercaptoamine-terminated polymers of Example 24.

Equal volumes of the solution of Example 24a and of this example are mixed under nitrogen at room temperature for thirty minutes and films cast and heated at 110° C. for two hours, at 135° C. for two hours, and at 250° C. for six hours. The films are insoluble in DMAC.

Example 26

The procedure of Example 2 is repeated using an equivalent amount of 4,4'-methylene-bis-salicylaldehyde, instead of the terephthaldehyde, and there is obtained a polymer solution containing the repeating unit to which is added 0.60 g. of a phenol-formaldehyde (saligenin) resin and films cast at 130° C. for three hours and at 200° C. for twelve hours, yielding a stiff brown film.

Example 27

The procedure of Example 2 is repeated using an equivalent amount of instead of terephthaldehyde and there is obtained a polymer containing the repeating unit which on heating at 180° C. for six hours yields a crosslinked polymer.

Example 28

The procedure of Example 2 is repeated and instead of terephthaldehyde, there is used an equivalent amount of the meta-dialdehyde, m-$C_6H_4(CHO)_2$, or $$(C_6H_4CHO)_2$$

or $O(C_6H_4CHO)_2$, or $CH_2(C_6H_4CHO)_2$, or $$SO_2(C_6H_4CHO)_2$$

or $C_6H_4(CONHC_6H_4CHO)_2$, and in each case high molecular weight polymers are obtained.

Example 29

Example 13 is repeated using instead of the pyromellitic diimide-dialdehyde derivative, an equivalent amount of the diimide-dialdehyde derived from benzophenonetetracarboxylicacid anhydride, and a polymer having properties similar to that of the polymer of Example 13 is obtained.

Example 30

The procedure of Example 2 is repeated using instead of dimercaptobenzidine an equivalent amount of

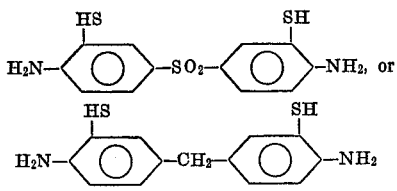

and in each case high molecular weight polymers are obtained.

What is claimed is:

1. The process of preparing a polythiazoline which comprises reacting in solution in an organic solvent and in an inert atmosphere a dialdehyde of the formula $Z(CHO)_2$ in which Z is a divalent organic radical with an aromatic bis-mercapto-amine containing two pairs of $NH_2$ and SH groups in which the $NH_2$ group in each pair is disposed ortho to the SH group in that pair and each $NH_2$ and SH group is attached directly to an aromatic ring.

2. The process of claim 1 in which said bis-mercaptoamine compound has the formula

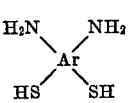

wherein Ar represents an organic tetravalent aromatic radical, and said dialdehyde has the formula $Z(CHO)_2$, in which Z is a divalent organic radical.

3. A thiazoline polymer comprising a plurality of repeating units having the formula

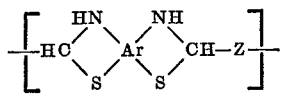

in which Ar repersents a tetravalent aromatic moiety in which —NH— and —S— are disposed ortho to each other and are attached to an aromatic ring, and Z is the divalent organic residue of a dialdehyde, $Z(CHO)_2$.

4. The process of claim 2 in which the dialdehyde is an aromatic dialdehyde.

5. The process of claim 4 in which the dialdehyde is selected from the class of

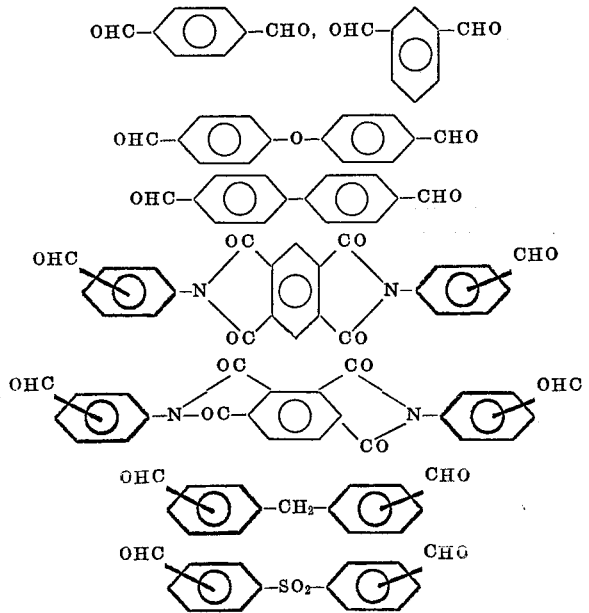

and

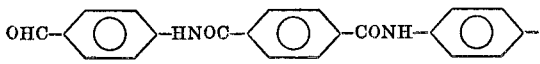

6. The process of claim 4 in which Ar is selected from the class of

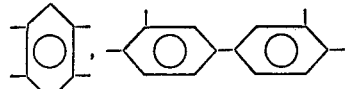
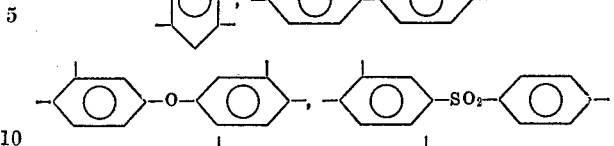
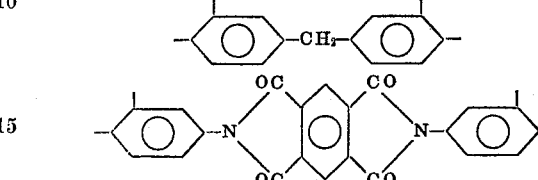

and

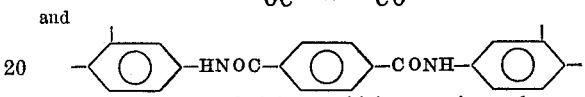

7. The process of claim 1 which comprises subsequently oxidizing the polythiazoline, and thereby preparing a polythiazole.

8. The process of claim 7 in which oxygen is the oxidizing agent.

9. The polymer product of claim 3 which also contains repeating units having the formula

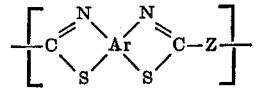

10. The product of claim 3 in which Ar is selected from the class of

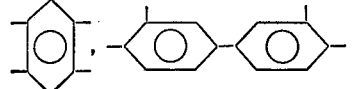
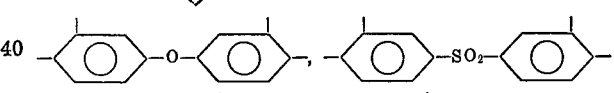
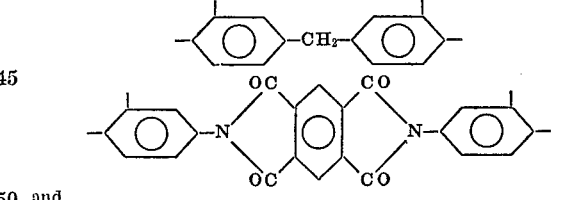

and

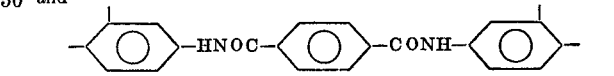

11. The product of claim 3 in which Z is selected from the class of

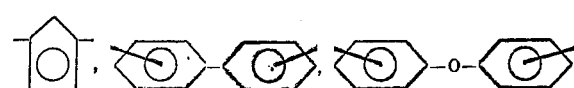
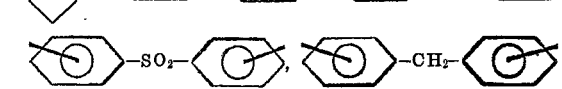
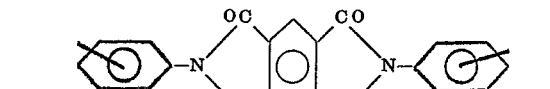
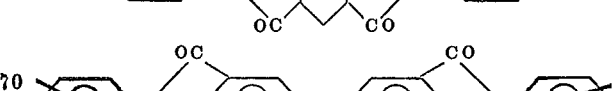

and

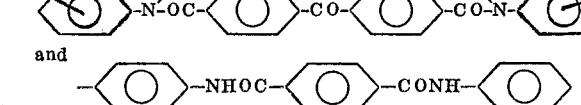

12. The process of claim 2 of preparing a mercapto-amine-terminated polymer which comprises reacting $n+1$ moles of

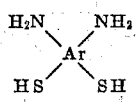

with $n$ moles of $Z(CHO)_2$.

13. The process of claim 2 of preparing an aldehyde-terminated polymer which comprises reacting $n+1$ moles of $Z(CHO)_2$ with $n$ moles of

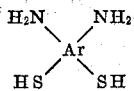

14. The process of claim 2 of preparing a modified polymer in which a portion of the bis-mercaptoamine is replaced by an equivalent amount of

in which Ar″ is a divalent aromatic moiety corresponding to Ar in which $NH_2$ and Y are ortho-disposed to each other and attached to an aromatic ring, and Y represents —SH, $NH_2$ and NHR in which R is a hydrocarbon containing one to twelve carbon atoms.

15. The process of claim 2 of preparing a copolymer containing imidazole moieties in which less than 50 mole percent of

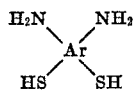

is replaced by

![](H2N, NH2, Ar, R'HN, NHR')

in which R' represents hydrogen and a hydrocarbon containing one to twelve carbon atoms and oxidizing the copolymer.

16. A process of preparing films which comprises casting a film from a solution of the polymer of claim 2 and oxidizing the film.

17. A process of preparing fibers which comprises spinning a solution of the polymer of claim 2 and oxidizing the fiber.

18. The process of preparing impregnated and coated products which comprises contacting a substrate with a solution of the polymer of claim 2 and oxidizing the polymer in-situ.

19. A polymer, oxidizable to a thiazole, containing the repeating unit

![polymer structure 19]

20. A polymer, oxidizable to a thiazole, containing the repeating unit

![polymer structure 20]

21. A polymer containing the repeating unit

![polymer structure 21]

References Cited
UNITED STATES PATENTS

| | | | |
|---|---|---|---|
| 3,047,543 | 7/1962 | Morton et al. | 260—79 |
| 3,260,700 | 7/1966 | Rudner et al. | 260—47 |
| 3,355,426 | 11/1967 | Craven | 260—47 |
| 3,424,720 | 11/1969 | Rudner et al. | 260—47 |
| 3,448,080 | 6/1969 | Hirsch | 260—47 X |
| 3,493,541 | 2/1970 | Gall | 260—72.5 |

HOWARD E. SCHAIN, Primary Examiner

U.S. Cl. X.R.

117—128.4, 138.8 D, 148, 155 R, 161 L, 161 LN; 161—261, 263; 260—30.2, 30.4 N, 30.6 R, 30.8 R, 30.8 DS, 31.2 N, 32.4, 32.6 N, 47 R, 64, 65, 304

UNITED STATES PATENT OFFICE
CERTIFICATE OF CORRECTION

Patent No. 3,681,297          Dated August 1, 1972

Inventor(x) Gaetano F. D'Alelio

It is certified that error appears in the above-identified patent and that said Letters Patent are hereby corrected as shown below:

In Column 2, Line 21, change "$Z(COH)_2$" to read

--- $Z(CHO)_2$ ---;

In Column 26, Lines 8 and 9, correct the second formula to read:

In Column 26, Lines 73 and 74, correct the formula to read:

Signed and sealed this 23rd day of January 1973.

(SEAL)
Attest:

EDWARD M. FLETCHER, JR.
Attesting Officer

ROBERT GOTTSCHALK
Commissioner of Patents